(12) United States Patent
Gorman et al.

(10) Patent No.: US 6,705,447 B2
(45) Date of Patent: Mar. 16, 2004

(54) PISTON FOR HYDRAULICALLY-OPERATED CLUTCH

(75) Inventors: Michael Joseph Gorman, Ann Arbor, MI (US); Shushan Bai, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 14 days.

(21) Appl. No.: 10/093,025

(22) Filed: Mar. 7, 2002

(65) Prior Publication Data
US 2003/0168306 A1 Sep. 11, 2003

(51) Int. Cl.⁷ ............................................... F16H 25/06
(52) U.S. Cl. ............................ 192/85 AA; 192/106 F; 192/52.5
(58) Field of Search .................... 192/85 AA, 106 F, 192/109 F, 52.5

(56) References Cited

U.S. PATENT DOCUMENTS

| 3,647,037 | A | * | 3/1972 | Toma | 192/106 F |
| 4,271,951 | A | * | 6/1981 | Nishimura et al. | 192/106 F |
| 4,458,797 | A | * | 7/1984 | Hawkins | 192/52.4 |
| 4,509,627 | A | * | 4/1985 | Kawamoto | 192/85 F |
| 5,421,439 | A | | 6/1995 | Hayasaki | 192/85 AA |
| 5,439,088 | A | | 8/1995 | Michioka et al. | 192/85 AA |
| 5,542,517 | A | * | 8/1996 | Peruski | 192/85 AA |
| 5,950,787 | A | * | 9/1999 | Murasugi et al. | 192/85 AA |
| 6,035,989 | A | * | 3/2000 | Matsuoka | 192/85 AA |
| 6,244,407 | B1 | | 6/2001 | Kremer et al. | 192/70.12 |
| 6,415,901 | B1 | * | 7/2002 | Usoro | 192/85 AA |

* cited by examiner

Primary Examiner—Charles A Marmor
Assistant Examiner—Eric M. Williams
(74) Attorney, Agent, or Firm—Leslie C. Hodges

(57) ABSTRACT

A hydraulically-operated clutch for an automatic transmission includes a clutch housing assembly with a clutch pack positioned therein. A movable piston is supported in the clutch housing assembly and defines an expandable chamber between the piston and clutch housing assembly. Pressurized fluid is provided to the expandable chamber to effect movement of the piston between engaged and disengaged positions with respect to the clutch pack. The piston and clutch housing assembly are configured such that only a small portion of the expandable chamber is pressurized when the piston is in the disengaged position, thereby providing improved response time for movement of the piston to the engaged position.

13 Claims, 4 Drawing Sheets

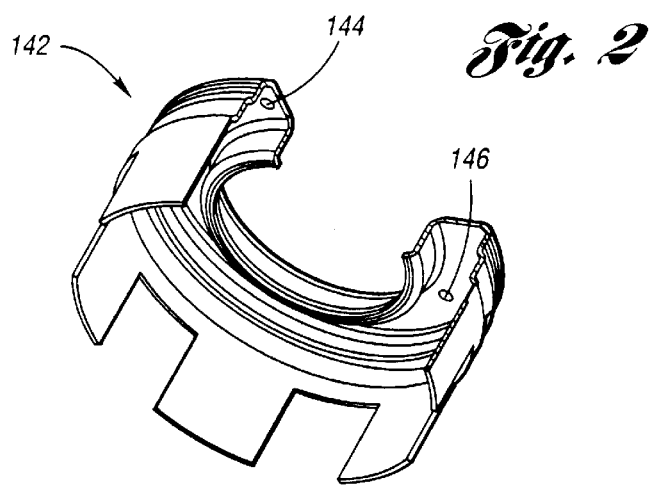
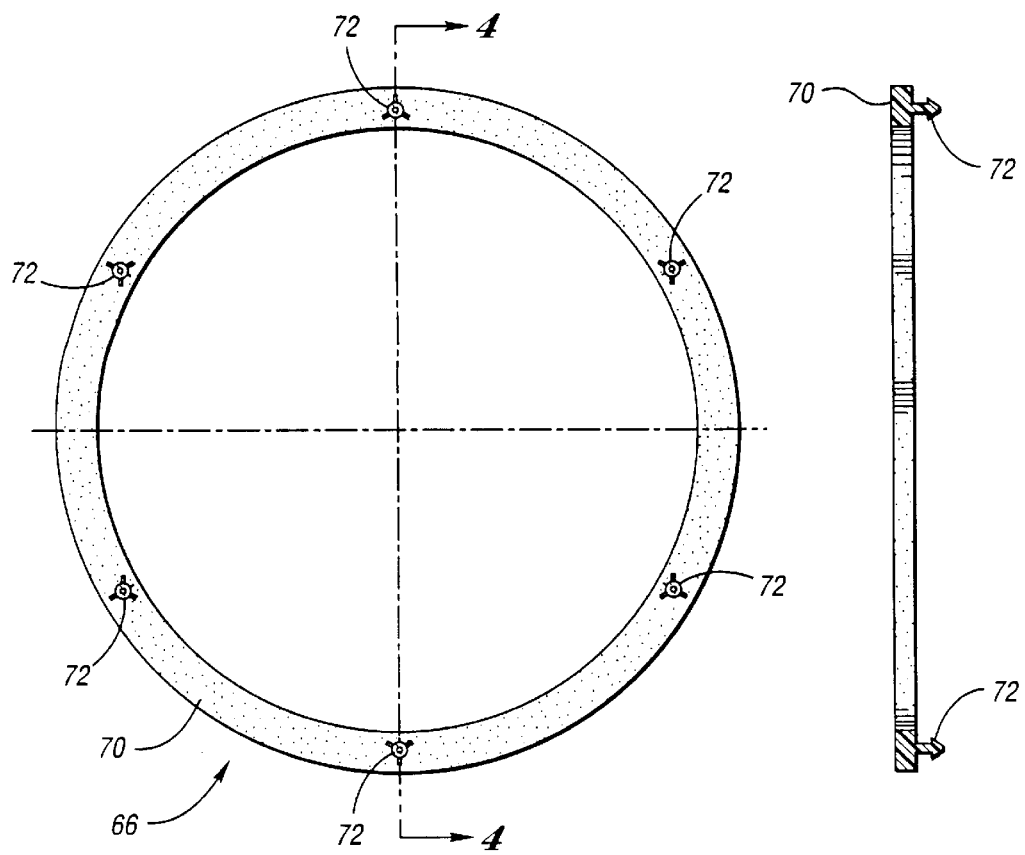

PISTON FOR HYDRAULICALLY-OPERATED CLUTCH

TECHNICAL FIELD

The present invention relates to a piston for a hydraulically-operated clutch in which an expandable piston actuating chamber is partitioned so that only a small portion of the expandable chamber is in fluid communication with a source of pressurized fluid when the piston is disengaged, thereby improving response time for movement of the piston away from the disengaged position.

BACKGROUND OF THE INVENTION

Automatic transmission clutches generally include a clutch drum (driving member) having an expandable piston-operating fluid chamber, a piston axially slidably positioned against the piston-operating fluid chamber, a clutch hub (driven member) coaxially disposed in the clutch drum, and a clutch plate pack interposed between the clutch drum and the clutch hub having one end directed to the piston. The clutch plate pack includes first and second groups of plates which are alternately juxtaposed. When the fluid chamber is fed with a pressurized operating fluid, the piston is forced to press the clutch plate pack thereby to engage the first and second groups of clutch plates. Under this engaged condition, the clutch drum and the clutch hub are united and thus can rotate together. When the pressurized operating fluid is drawn from the fluid chamber, the piston releases the clutch plate pack thereby to cancel the engagement between the first and second groups of clutch plates. Under this disengaged condition, the clutch drum and the clutch hub can rotate separately or individually.

These hydraulically-actuated friction clutches and brakes frequently include balance dams that provide accurate, consistent control of gear ratio changes. The balance dam creates a centrifugal hydraulic pressure that opposes and balances centrifugal hydraulic pressure developed on the apply side of the piston. These centrifugal pressures are caused by rotation of the entire clutch assembly. In this way, pressure effects due to the speed of rotation can be eliminated or reduced to a point where the control system pressure alone creates the force operative to engage the friction element.

There remains a need in the automatic transmission art to provide improved response time for gear shifting, particularly in those vehicles having push-button shifting available with automatic transmissions. It is desirable that a push-button actuated shift would occur in less than 0.5 second. Existing hydraulically-operated clutch mechanisms are unable to provide such a quick response.

SUMMARY OF THE INVENTION

The present invention provides a fast-acting piston for actuating a clutch assembly wherein an expandable chamber on the apply side of the piston is partitioned so that only a small portion of the expandable chamber is initially pressurized to move the piston toward the engaged position against the clutch pack.

More specifically, the present invention provides a hydraulically-operated clutch for an automatic transmission, including a clutch housing assembly with a clutch pack positioned therein. A movable piston is supported in the clutch housing assembly and defines an expandable chamber between the piston and clutch housing assembly. A source of pressurized fluid is positioned in communication with the expandable chamber to effect movement of the piston between engaged and disengaged positions with respect to the clutch pack. A partition structure is configured to partition the expandable chamber such that only a small portion of the expandable chamber is in fluid communication with the source of pressurized fluid when the piston is in the disengaged position, and the entire expandable chamber is in fluid communication with the source of pressurized fluid when the piston is in the engaged position, thereby providing improved response time for movement of the piston away from the disengaged position.

The clutch also includes a balance dam member defining a balance dam chamber between the piston and the balance dam member. The piston includes a port connecting the balance dam chamber with the expandable chamber, and a check valve is positioned in communication with the port.

In a preferred embodiment, the check valve is a movable ring which is juxtaposed against a plurality of openings in the piston to selectively block the openings to discommunicate the expandable chamber from the balance dam chamber.

Preferably, the clutch housing assembly includes an annular ring which is engageable with the piston to function as a partition structure to divide the expandable chamber to form the small portion of the expandable chamber. The annular ring is positioned on a clutch chamber hub member. Also, the piston includes a substantially cylindrical radially inward portion which cooperates with the ring to define the small portion of the expandable chamber.

The invention also contemplates a method of actuating a piston in a hydraulically-operated clutch, as described above, wherein the small portion of the expandable chamber is communicated with the source of pressurized fluid when the piston is in the disengaged position, and the entire expandable chamber is in fluid communication with the source of pressurized fluid when the piston is in the engaged position.

Accordingly, an object of the invention is to provide a hydraulically-operated clutch for an automatic transmission with improved response time for actuating the clutch.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is a partially cut-away perspective view of a slightly modified embodiment of a piston for use with the clutch of FIGS. 1a and 1b;

FIG. 3 shows a plan view of an annular ring corresponding with the embodiment of FIGS. 1a and 1b;

FIG. 4 shows a cross-sectional side view of the annular ring of FIG. 3;

DESCRIPTION OF THE PREFERRED EMBODIMENT

Figure 1A:
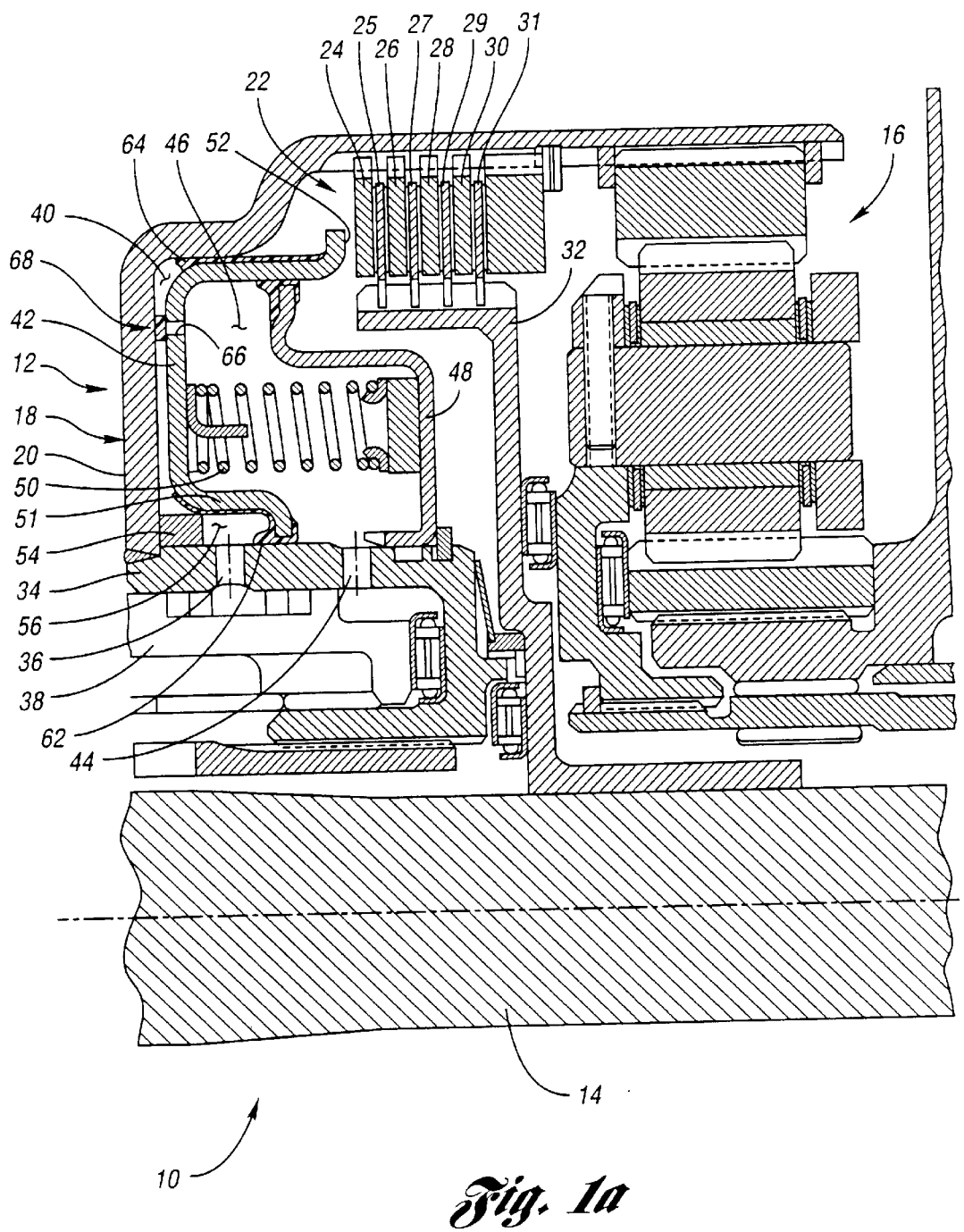
FIG. 1a is a partial cross-sectional side view illustrating a hydraulically-operated clutch in a disengaged position in accordance with the invention.
Figure 1B:
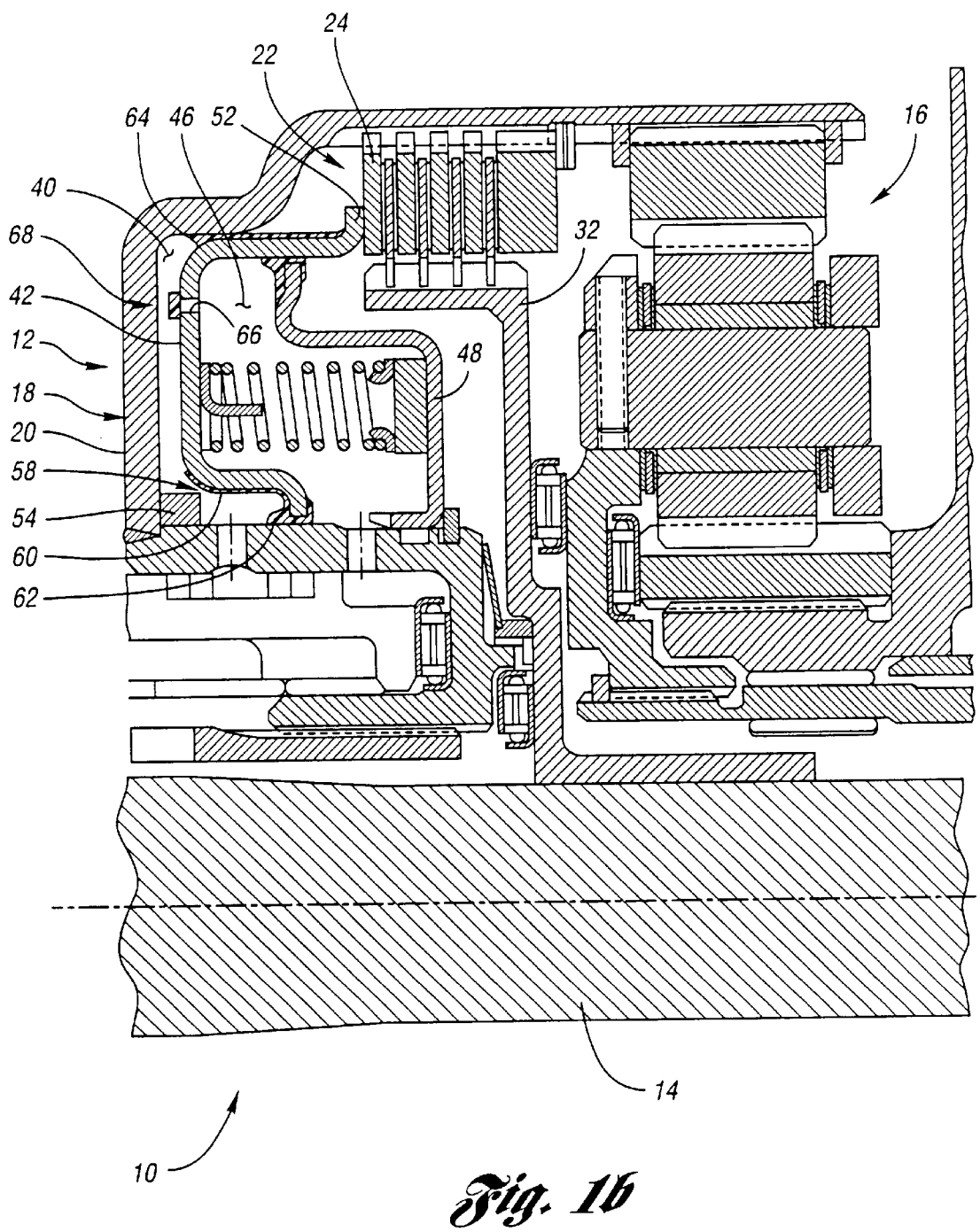
FIG. 1b is a partial cross-sectional side view of the hydraulically-operated clutch of FIG. 1a, in the engaged position.

FIGS. 1a and 1b show partial cross-sectional views of an automatic transmission 10 including a clutch assembly 12 positioned on a driveshaft 14 adjacent a planetary gear set 16.

The clutch assembly 12 includes a clutch housing assembly 18, which includes a clutch drum 20. A clutch pack 22 is positioned within the drum 20, and includes a clutch apply plate 24 which is splined to the clutch drum 20 along with the clutch plates 26, 28 and 30. Clutch plates 25,27,29,31 are splined to the driven member 32 and are juxtaposed between the plates 24,26,28,30 for frictional engagement therewith to selectively connect the clutch drum 20 to the driven member 32 for rotation therewith.

The clutch housing assembly 18 also includes a rotating clutch hub member 34 which is welded to the clutch drum 20. The rotating clutch hub member 34 includes a centerline supply port 36 formed therein to communicate oil into an expandable chamber 40 from a source of pressurized oil supplied through a channel 38. The expandable chamber 40 is formed between the clutch drum 20 and the movable piston 42. The rotating clutch hub member 34 also includes a second centerline supply port 44 which communicates oil from the channel 38 to the balance dam chamber 46, which is formed between the piston 42 and the balance dam member 48.

A return spring 50 biases the piston 42 in a direction to reduce the size of the expandable chamber 40. The piston 42 includes inner and outer lip seals 62,64, respectively, to seal the expandable chamber 40.

When pressurized fluid (oil) is provided to the expandable chamber 40 through the centerline supply port 36, the pressure of this fluid acts against the piston 42 to force the piston 42 to the right, as viewed in FIGS. 1a and 1b, to force the contact surface 52 of the piston 42 toward the clutch apply plate 24. Higher magnitudes of oil pressure supplied to the expandable chamber 40 further expands the chamber 40 and provides high forces against the clutch apply plate 24 to forcibly compress the respective clutch plates 24,25,26, 27,28,29,30,31 together to engage the clutch drum 20 with the driven member 32 for rotation therewith. Accordingly, the piston 42 is movable between the disengaged position shown in FIG. 1a and the engaged position shown in FIG. 1b, wherein the contact surface 52 of the piston 42 contacts the clutch apply plate 24.

The clutch housing assembly 18 includes an annular ring 54 (partition structure) which is secured to the rotating clutch hub member 34 and to the clutch drum 20. The annular ring 54 is operative to partition the expandable chamber 40 so that only a small portion 56 of the expandable chamber 40 is in communication with the centerline supply port 36 when the piston 42 is in the disengaged position, as shown in FIG. 1a. In this configuration, the piston 42 may be quickly actuated away from the disengaged position because only a small quantity of pressurized oil must be provided through the centerline supply port 36 to quickly fill and pressurize the small portion 56 of the expandable chamber 40 to force the piston 42 toward the engaged position. This configuration substantially improves actuation time for the clutch assembly 12. The small portion 56 is substantially smaller, radially with respect to the central axis of the piston, than the entire chamber 40.

As shown in FIG. 1a, the piston 42 includes a substantially cylindrical radially inward portion 51 which, in cooperation with the ring 54 and the rotating clutch hub member 34, defines the small portion 56 of the expandable chamber 40.

As shown in FIG. 1b, as the piston 42 moves toward the clutch pack 22 so that the contact surface 52 of the piston 42 nearly contacts the clutch apply plate 24, a gap 58 is formed between the annular ring 54 and the seal 60 on the piston 42 so that pressurized oil from the centerline supply port 36 is fed into the entire expandable chamber 40 to provide a desired magnitude of oil pressure induced force against the piston 42 to control the clutch pack 22.

As shown in FIGS. 1a and 1b, a port 66 provides fluid communication between the expandable chamber 40 and the balance dam chamber 46. A check valve 68 closes the port 66 when oil pressure in the expandable chamber 40 is higher than the pressure in the balance dam chamber 46 so that the piston 42 may be forced against the clutch pack 22 to control the clutch pack 22.

FIG. 2 shows a partially cut-away perspective view of a piston 142 in accordance with a slightly revised alternative embodiment of the invention wherein a plurality of openings 144,146 are provided in the piston 142 to form the port which connects the expandable chamber with the balance dam chamber.

Figure 5A:
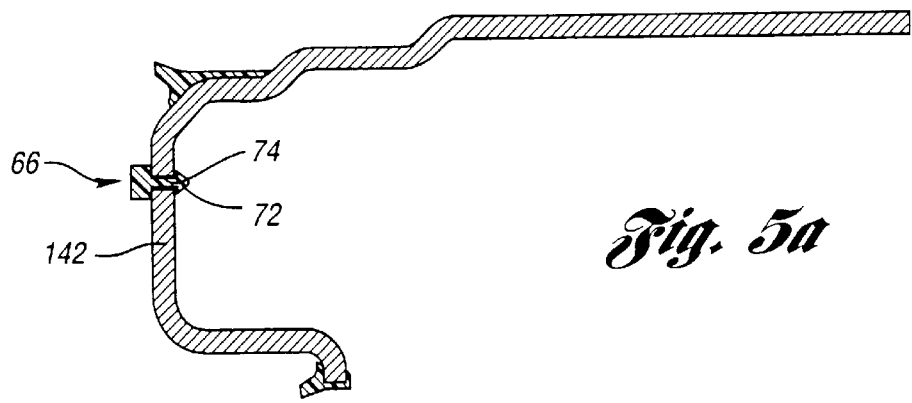
FIG. 5a shows a partial cross-sectional side view of the piston of FIG. 2 engaged with the annular ring of FIGS. 3 and 4, with the ring in the closed position.
Figure 5B:
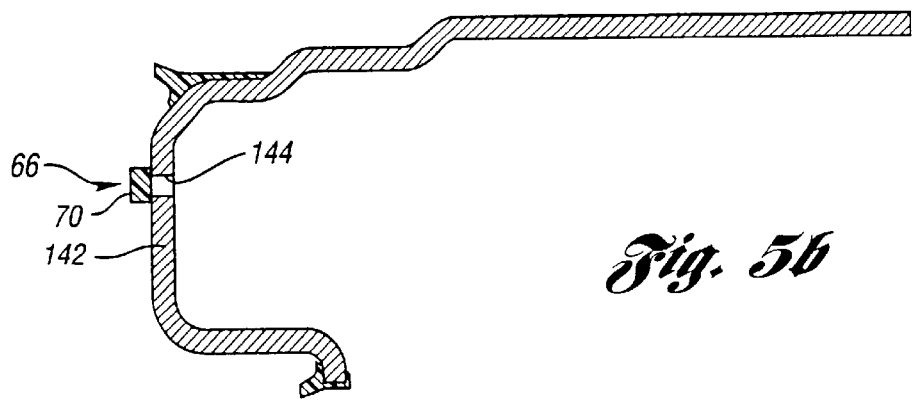
FIG. 5b shows a radially offset (i.e., rotated) cross-sectional view of the assembly of FIG. 5a, illustrating the port between the expandable chamber and the balance dam chamber in the closed position.

FIGS. 3 and 4 illustrate a molded plastic ring 70 which forms the check valve 66 corresponding with FIGS. 1a and 1b. As shown, the molded plastic ring 70 includes a plurality of integrally molded nylon barbs 72. The relationship between the check ring 66 and the piston 142 is shown in FIGS. 5a, 5b, 6a and 6b. As shown in the closed position in FIGS. 5a and 5b, the barbs 72 of the check valve 66 extend through corresponding holes 74 in the piston 142. As shown in FIG. 5b, in the closed position, the ring 70 of the check valve 66 blocks the hole 144 of the piston 142 to discommunicate the expandable chamber from the balance dam chamber. The check valve 66 is in this closed position when the pressure in the expandable chamber exceeds the pressure in the balance dam chamber.

Figure 6A:
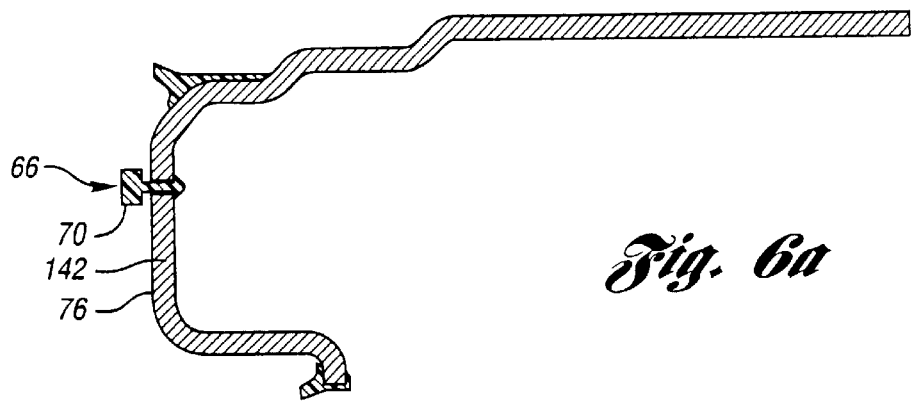
FIG. 6a shows a partial cross-sectional view of the piston and annular ring of FIG. 5a, with the annular ring in the open position with respect to the port.
Figure 6B:
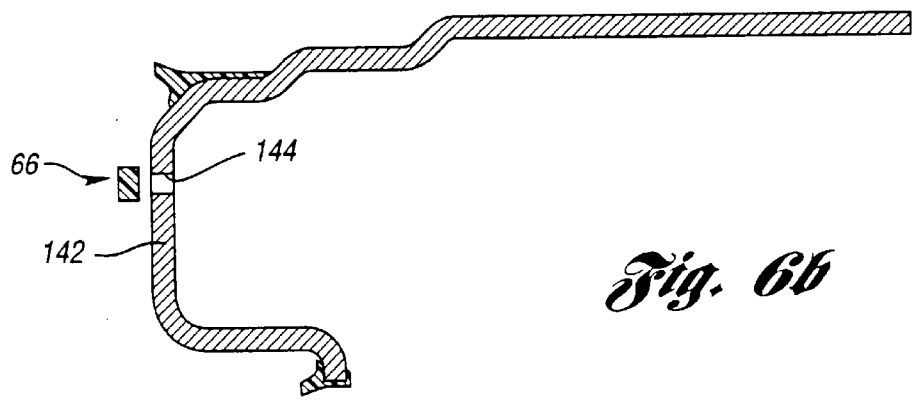
FIG. 6b shows a radially offset (i.e., rotated) partial cross-sectional view of the piston and annular ring of FIG. 6a, illustrating the port in the open position.

When oil is drained from the expandable chamber (on the apply side 76 of the piston 142), the pressure in the balance dam chamber will eventually exceed the pressure in the expandable chamber, and the check valve 66 moves to the open position, as shown in FIGS. 6a and 6b, wherein each of the holes 144 which form the port communicates the balance dam chamber with the expandable chamber to allow flow of oil through the port.

Accordingly, the invention provides a fast-acting clearance take-up feature achieved by introducing oil into the small portion 56 of the expandable chamber. The small volume of oil in the small portion 56 of the chamber advances the piston, compressing the return spring 50 and rapidly moving the piston 42 into contact with the clutch apply plate 24. Oil from the centrifugal balance chamber 46 passes through the ports 66 and check valve 68. Thus, most of the oil volume required to fill the fully stroked apply piston chamber (expandable chamber) does not have to be supplied through the centerline supply port 36 as the piston is initially advanced toward the engaged position.

When the piston 46 is advanced sufficiently to apply a normal force to the clutch apply plate 24, the oil pressure applied through the centerline supply port 36 closes the check valve 68 and the clutch capacity may be finely modulated via the centerline apply pressure through the port 36.

To release the clutch, the centerline pressure is reduced so as to control the time rate of decay of clutch capacity. When the return spring pack force is greater than the apply normal force, the volume of oil in the apply chamber is displaced to exhaust via the centerline apply port 36.

Accordingly, the invention provides improved clutch response time, and the balance dam feature provides precise centerline pressure control of clutch capacity.

This invention also improves regulator valve performance by avoiding valve overshoot because the valve is not required to handle quick changes from high flow to low flow, thereby easing pressure regulation.

While the best mode for carrying out the invention has been described in detail, those familiar with the art to which this invention relates will recognize various alternative designs and embodiments for practicing the invention within the scope of the appended claims.

What is claimed is:

1. A hydraulically operated clutch for an automatic transmission, comprising:
    a clutch housing assembly;
    a clutch pack positioned in the clutch housing assembly;
    a movable piston supported in the clutch housing assembly defining an expandable chamber between the piston and clutch housing assembly;
    a source of pressurized fluid in communication with said expandable chamber to effect movement of the piston between engaged and disengaged positions with respect to the clutch pack; and
    a partition structure configured to partition the expandable chamber such that only a small portion of said expandable chamber is in fluid communication with said source of pressurized fluid when the piston is in the disengaged position, and the entire expandable chamber is in fluid communication with said source of pressurized fluid when the piston is in the engaged position, thereby providing improved response time for movement of the piston away from the disengaged position, wherein said partition structure comprises an annular ring positioned on a hub member for engagement with the piston to form said small portion, and said hub member having a supply port for communicating said pressurized fluid to said expandable chamber, a balance dam member defining a balance dam chamber between the piston and the balance dam member, said piston forming a port connecting the balance dam chamber with the expandable chamber, with a check valve positioned in communication with the port.

2. The hydraulically operated clutch of claim 1, wherein said check valve comprises a ring movable to block a plurality of openings which form the port in the piston.

3. The hydraulically operated clutch of claim 2, further comprising a return spring biasing the piston in a direction to reduce the size of the expandable chamber.

4. The hydraulically operated clutch of claim 1, wherein said piston comprises a substantially cylindrical radially inward portion which cooperates with said ring to form said small portion of the expandable chamber.

5. The hydraulically operated clutch of claim 1, wherein said piston includes outer and inner lip seals to seal the piston with the clutch housing assembly and hub member, respectively.

6. A hydraulically operated clutch for an automatic transmission, comprising:
    a clutch housing assembly;
    a clutch pack positioned in the clutch housing assembly;
    a movable piston supported in the clutch housing assembly defining an expandable chamber between the piston and clutch housing assembly;
    a source of pressurized fluid in communication with said expandable chamber to effect movement of the piston between engaged and disengaged positions with respect to the clutch pack;
    said piston and clutch housing assembly being configured such that only a small portion of said expandable chamber is in fluid communication with said source of pressurized fluid when the piston is in the disengaged position, and the entire expandable chamber is in fluid communication with said source of pressurized fluid when the piston is in the engaged position, thereby providing improved response time for movement of the piston away from the disengaged position;
    a balance dam member defining a balance dam chamber between the piston and the balance dam member; and
    said piston forming a port connecting the balance dam chamber with the expandable chamber, with a check valve positioned in communication with the port.

7. The hydraulically operated clutch of claim 6, wherein said check valve comprises a ring movable to block a plurality of openings which form the port in the piston.

8. The hydraulically operated clutch of claim 7, wherein said clutch housing assembly includes an annular ring engageable with the piston to form said small portion of the expandable chamber.

9. The hydraulically operated clutch of claim 8, wherein said annular ring is positioned on a clutch chamber hub member.

10. The hydraulically operated clutch of claim 9, wherein said piston includes outer and inner lip seals to seal the piston with the clutch housing assembly and hub member, respectively.

11. The hydraulically operated clutch of claim 8, wherein said piston comprises a substantially cylindrical radially inward portion which cooperates with said ring to form said small portion of the expandable chamber.

12. The hydraulically operated clutch of claim 6, further comprising a return spring biasing the piston in a direction to reduce the size of the expandable chamber.

13. A method of hydraulically actuating a clutch for an automatic transmission, comprising:
    providing a clutch housing assembly with a clutch pack and movable piston supported in the clutch housing assembly such that an expandable chamber is formed between the piston and the clutch housing assembly;
    providing a source of pressurized fluid in communication with the expandable chamber to effect movement of the piston between engaged and disengaged positions with respect to the clutch pack;
    partitioning the expandable chamber so that only a small portion of the expandable chamber is communicated with a source of pressurized fluid when the piston is in the disengaged position to improve response time for actuation of the piston away from the disengaged position;
    communicating the entire expandable chamber with the source of pressurized fluid when the piston is in the engaged position; and
    communicating a balance dam chamber with the expandable chamber through a check valve.

* * * * *